US007694282B2

(12) United States Patent
Arkhipov et al.

(10) Patent No.: US 7,694,282 B2
(45) Date of Patent: Apr. 6, 2010

(54) MAPPING BREAKPOINTS BETWEEN WEB BASED DOCUMENTS

(76) Inventors: Mikhail E. Arkhipov, 18120 159th Ave. NE., Woodinville, WA (US) 98072; Gregg B. Miskelly, One Microsoft Way, Redmond, WA (US) 98052; Wai Hang Tang, 9009 Avondale Rd. NE. #E109, Redmond, WA (US) 98052; Abhijit Rao, 4343 Roosevelt Way NE. #408, Seattle, WA (US) 98105

( * ) Notice: Subject to any disclaimer, the term of this patent is extended or adjusted under 35 U.S.C. 154(b) by 784 days.

(21) Appl. No.: 11/609,805

(22) Filed: Dec. 12, 2006

(65) Prior Publication Data

US 2008/0141118 A1     Jun. 12, 2008

(51) Int. Cl.
*G06F 9/44* (2006.01)

(52) U.S. Cl. ...................................................... 717/129

(58) Field of Classification Search ................. 717/124, 717/129

See application file for complete search history.

(56) References Cited

U.S. PATENT DOCUMENTS

| | | | |
|---|---|---|---|
| 6,585,777 B1 | 7/2003 | Ramaley et al. ............. | 715/513 |
| 6,674,924 B2 | 1/2004 | Wright et al. ............... | 382/306 |
| 6,848,078 B1 | 1/2005 | Birsan et al. ................ | 715/511 |
| 6,907,420 B2 | 6/2005 | Gensel ......................... | 707/1 |
| 6,956,416 B2 | 10/2005 | Wilson et al. ................ | 715/513 |
| 6,963,930 B2 | 11/2005 | Halpert et al. ............... | 709/246 |
| 7,080,083 B2 | 7/2006 | Kim et al. .................... | 707/100 |
| 7,203,926 B2* | 4/2007 | Bogle et al. .................. | 717/124 |
| 7,398,519 B2* | 7/2008 | Arnold et al. ................ | 717/129 |
| 2007/0168979 A1* | 7/2007 | Kumar et al. ................ | 717/124 |

OTHER PUBLICATIONS

Alon et al. "Typechecking XML views of relational databases", Jul. 2003, ACM, TOCL vol. 4, Issue 3, pp. 315-354.*
Mega et al. "Debugging distributed object applications with the Eclipse platform", Oct. 2004, ACM, pp. 42-46.*

* cited by examiner

*Primary Examiner*—Anna Deng
(74) *Attorney, Agent, or Firm*—Workman Nydegger

(57) ABSTRACT

The present invention extends to methods, systems, and computer program products for mapping breakpoints between Web based documents. Embodiments of the invention facilitate extracting corresponding client script blocks from different Web based documents to disassociate the client script blocks with their relative locations within the Web based documents. From the extracted client side script blocks, a position for mapping a breakpoint from one client side script block another client side script block can be determined. The breakpoint is then copied from the one client script block and inserted into the determined position in the other client script block. The client script blocks can then be re-associated with their relative locations in the Web based documents from which they were extracted.

20 Claims, 7 Drawing Sheets

```
1  <%@ Page Language="C#" AutoEvent Wireup="true" CodeFile ="Default.as
2
3  <!DOCTYPE html PUBLIC "-//W3C//DTD XHTML 1.0 Transitional//EN" "http
4
5  <html xmlns="http://www.w3.org/1999/xhtml" >
6  <head runat="server">
7      <title>Untitled Page</title>
8      <script language="javascript" type="text/javascript">
9      <!--
10
11     function Button2_onclick() {
12         alert ("<%
13             if (Label1.Text != "")
14                 Response.Write ("Both Server and Client buttons have
15             else
16                 Response.Write ("Please click the Server button first
17         %>);
18         span1.innerHTML = "Client Button has been clicked";
19     }
20
21     // -->
22     </script>
23 </head>
24 <body>
25     <form id="form1" runat="server">
26
27     <div>
28         <asp:Button ID="Button1" runat="server" Text="Server Button"
29         <asp:Label ID="Label1" runat="server"></asp:Label>
30         <br />
31         <input id="Button2" type="button" value="Client Button" lan
32         <span id="span1"></span>
33     </div>
34     </form>
35 </body>
36 </html>
37
```

Design-Time Document 201

```
1
2
3  <!DOCTYPE html PUBLIC "-//W3C//DTD XHTML 1.0 Transitional//EN" "http
4
5  <html xmlns="http://www.w3.org/1999/xhtml" >
6  <head runat="server">
7      Untitled Page
8  </title>
9      <script language="javascript" type="text/javascript">
10     <!--
11
12     function Button2_onclick() {
13         alert ("Both Server and Client buttons have") ;
14         span1.innerHTML = "Client Button has been clicked"; }
15     }
16
17     // -->
18     </script>
19 </head>
20 <body>
21     <form name="form1" method="post" action="default.aspx" id="form1"
22 <div>
23 <input type="hidden" name="_VIEWSTATE" id="_VIEWSTATE" value="/wEPl
24 </div>
25
26
27     <div>
28         <input type="submit" name="Button1" value="Server Button" id=
29         <span id="Label1"></span>
30         <br />
31         <input id="Button 2" type="button" value="Client Button" language
32         <span id="span1"></span>
33     </div>
34
35 <div>
36     <input type="hidden" name="_EVENTVALIDATION" id="_EVENTVALID
37 </div></form>
```

Run-Time Document 202

Mapping 272
Mapping 271

FIG. 2

MAPPING BREAKPOINTS BETWEEN WEB BASED DOCUMENTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

For example, scripts can be used to perform more complex operations than otherwise allowable using only HTML directives. Scripts can be developed in a scripting (programming) language, such as, for example, Java, ASP, or ASP .Net. When a Web browser is directed to a Web page that includes script, the corresponding Web server passes the script off to an appropriate script engine for processing. The script engine processes the script and returns corresponding HTML directives representative of the scripts functionality.

The corresponding HTML directives are then injected into a run-time Web page for return to the Web browser. For example, if a script is configured to query and return 10 database rows, the script engine returns the 10 database rows in a HTML format to the Web server. The Web server then injects the HTML representing the 10 database rows into any other HTML directives in the run-time Web page. After all scripts are processed, the resulting HTML of the run-time Web page is sent back to the Web browser. The Web browser subsequently renders the HTML of the run-time Web page.

Some Web pages can also include client side scripts that are executed at the Web browser. Client side scripts can be included inline in a run-time Web page that is sent to a Web browser or can be previously copied to a Web browser. Client side scripts are useful for acquiring and presenting data that may be unique to a client machine, such as, for example, a local time and date. However, more complex client side scripts are also possible.

Accordingly, as with any programming language, there is often a need to "debug" script language commands when a script is exhibiting unintended behavior. One typical debugging technique is to insert "breakpoints" into code that is being debugged. During execution (of a script or any other program), reaching a breakpoint causes a temporary halt in execution. Halting execution permits the developer to examine the status of the program (e.g., variable values) at intermediate points during execution. From examination at intermediate points, the developer may be able to better determine the cause of the unintended behavior.

Since scripts can be executed both at servers and at clients, debugging scripts executed at either location is often needed. Debugging scripts that are to be run at a server, is a relatively straight forward process. A developer inserts any needed breakpoints into the server side script commands of a design-time document and then simulates a request for the design-time document to cause the server side script to run. During execution, the server side script halts execution at each break point so the developer can examine the status of the server side script.

Unfortunately, there is typically no way to insert breakpoints for debugging client side scripts into a design-time document and insure that those breakpoints remain in the appropriate locations in a resulting run-time document (e.g., Web page) sent to a Web browser. Since a server side script can inject server contents in to a Web page at run-time, there is always some likelihood that the number of lines of script code in a design-time document is replaced by a different number of injected lines of HTML directives in a corresponding run-time document. Thus, a particular line number in a design-time document can end up being a different line number in a corresponding run-time document. For example, injecting a large number of entries from a database to replace a few lines of script commands representing a database query can cause the number of lines in a design-time document and run-time document to differ.

Thus, placing a breakpoint in a location relative to client script block in a design-time document does not guarantee that the breakpoint remains in the same location relative to a client script block in a corresponding run-time document. Accordingly, developers often resort to manually locating the client script block within the corresponding run-time document and manually setting a breakpoint in an appropriate location within the run-time document.

BRIEF SUMMARY

The present invention extends to methods, systems, and computer program products for mapping breakpoints between Web based documents. A breakpoint mapping module receives a first Web based document including one or more client script blocks at one or more locations within the first Web based document. The breakpoint mapping module receives an indication that a breakpoint was inserted at a specified location within one of the one or more client script blocks in the first Web based document. The breakpoint mapping module receives a second Web based document including the one or more client scripts at one or more locations within the second Web based document.

The breakpoint mapping module parses the first Web based document to separate the one or more client script blocks from other content in the first Web based document. The breakpoint mapping module parses the second Web based document to separate the one or more client script blocks from other content in the second Web based document. The breakpoint mapping module extracts the separated one or more client script blocks from other content in the first Web based document. The breakpoint mapping module extracts the separated one or more client script blocks from other content in the second Web based document.

The breakpoint mapping module maps the breakpoint in the first Web based document to a corresponding appropriate location in the second Web based document based on the extracted one or more client script blocks from the first Web based document, the extracted one or more client script blocks from the second Web based document, and the specified location of the breakpoint within the client script block in the first Web based document. The break point mapping module inserts the breakpoint into second Web based document at the mapped location or stores the location of mapped location for use during execution of the second Web based document. Accordingly, execution of the second Web based document is halted in an appropriate location within the one or more client side script blocks when the breakpoint is reached during processing of the second Web based document.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates Web based documents with a mapped breakpoint.

DETAILED DESCRIPTION

Figure 1A:
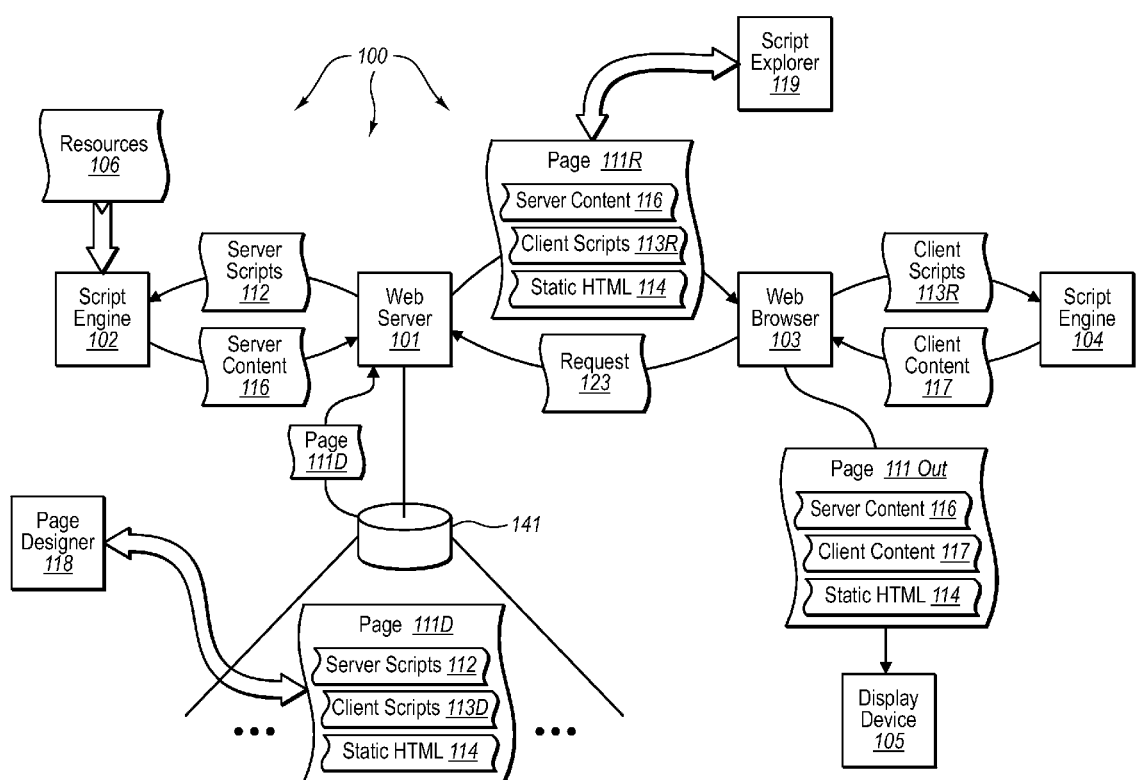
FIGS. 1A, 1B, and 1C illustrate components of an example computer architecture that facilitates mapping breakpoints between design-time and run-time documents.

The present invention extends to methods, systems, and computer program products for mapping breakpoints between Web based documents. A breakpoint mapping module receives a first Web based document including one or more client script blocks at one or more locations within the first Web based document. The breakpoint mapping module receives an indication that a breakpoint was inserted at a specified location within one of the one or more client script blocks in the first Web based document. The breakpoint mapping module receives a second Web based document including the one or more client scripts at one or more locations within the second Web based document.

The breakpoint mapping module parses the first Web based document to separate the one or more client script blocks from other content in the first Web based document. The breakpoint mapping module parsing the second Web based document to separate the one or more client script blocks from other content in the second Web based document. The breakpoint mapping module extracts the separated one or more client script blocks from other content in the first Web based document. The breakpoint mapping module extracts the separated one or more client script blocks from other content in the second Web based document.

The breakpoint mapping module maps the breakpoint in the first Web based document to a corresponding appropriate location in the second Web based document based on the extracted one or more client script blocks from the first Web based document, the extracted one or more client script blocks from the second Web based document, and the specified location of the breakpoint within the client script block in the first Web based document. The breakpoint mapping module inserts the breakpoint into the second Web based document at the mapped location or stores the location of mapped location for use during execution of the second Web based document. Accordingly, execution of the second Web based document is halted in an appropriate location within the one or more client side script blocks when the breakpoint is reached during processing of the second Web based document.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "breakpoint" is defined as a debugging structure that (when processed by a debug engine) temporarily halts (or breaks) execution of a script or other program when the breakpoint is reached within the script or other program during execution of the script or other program. For example, a debug engine can monitor script or program execution. When the debug engine detects a breakpoint, the debug engine can halt execution of the program or script. Halting execution permits a developer to examine the status of the script or other program (e.g., variable values) at intermediate points during execution. From examination at intermediate points, the developer may be able to better determine the cause of the unintended behavior. The developer can then issue a command to the debug engine to continue execution of the script or other program. Breakpoints can be inserted into server side scripts and client side scripts as desired.

Figure 1B:
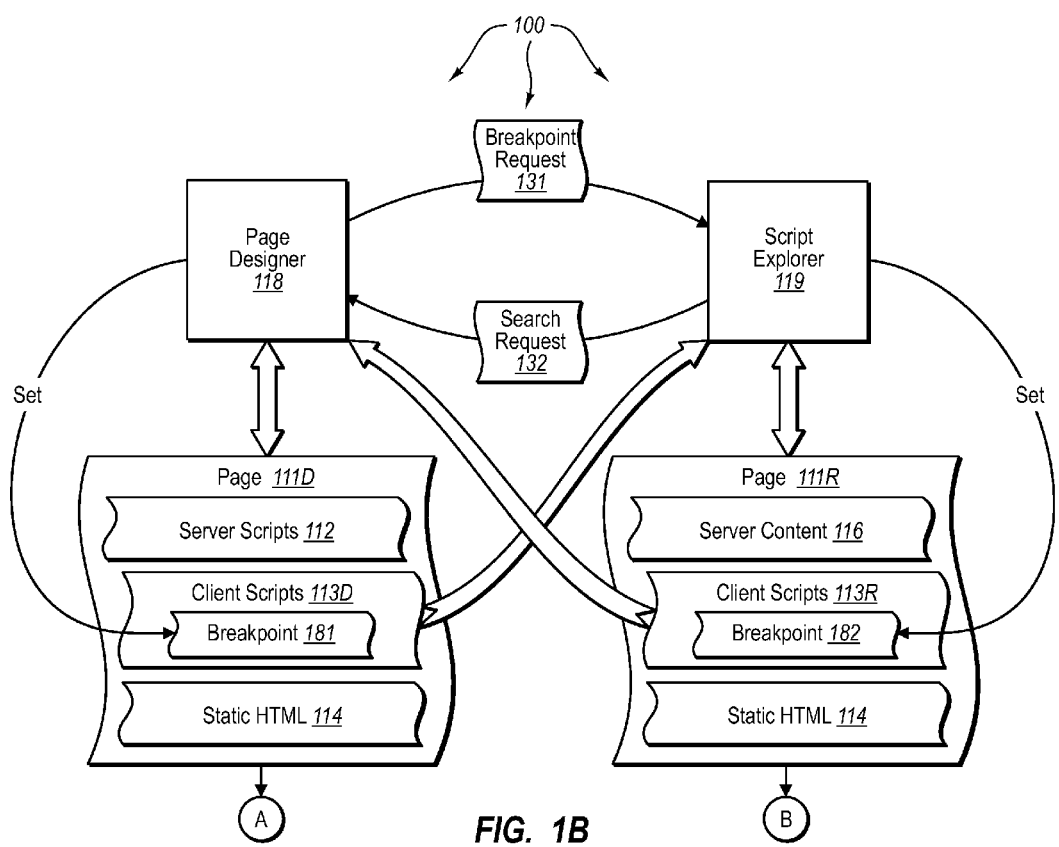
Figure 1C:
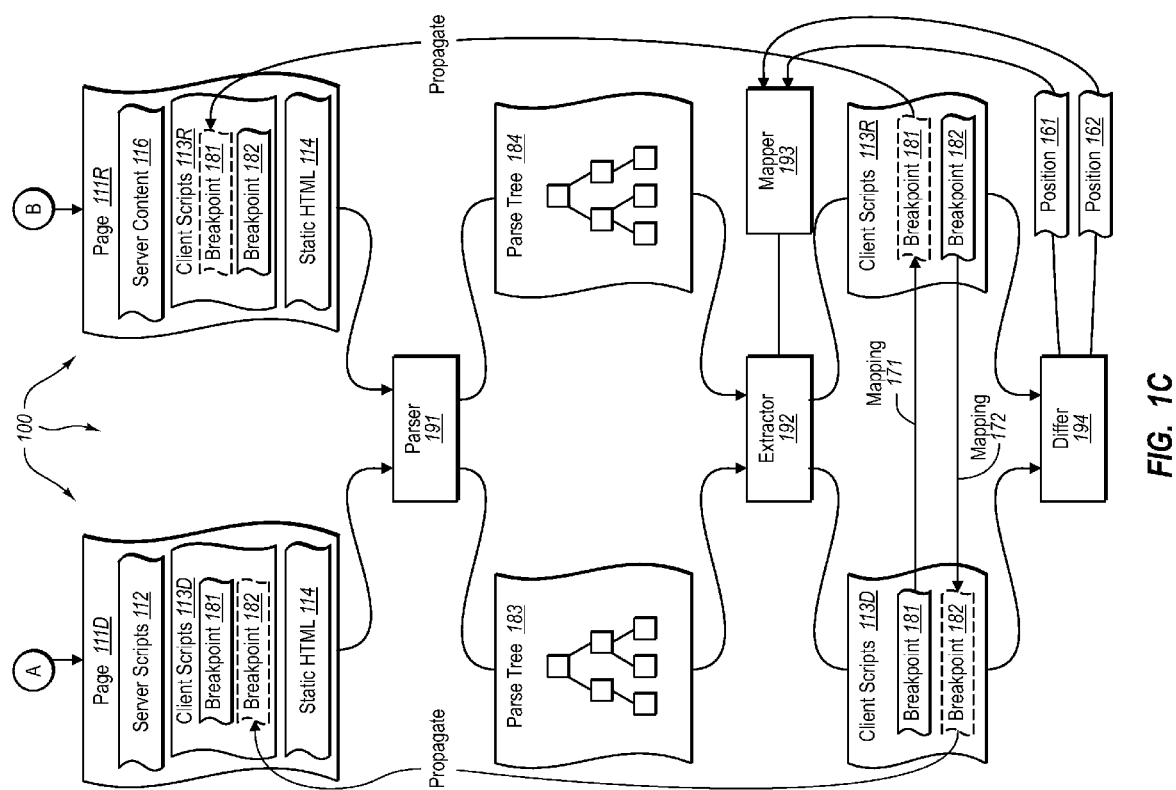

FIGS. 1A, 1B, and 1C illustrate components of an example computer architecture 100 that facilitates mapping breakpoints between design-time and run-time documents. As depicted in FIG. 1A, page designer 118 can be used to design Web pages, such as, for example, page 111D. Generally, designed Web pages can include various different types of content, such as, for example, server side scripts (scripts that are executed at a Web server), client side scripts (scripts that are executed at a Web browser), and static HyperText Markup Language ("HTML") instructions. For example, page 111D is designed to include server scripts 112, client scripts 113D, and static HTML 114. Scripts can be in any script language, such as, for example, JavaScript.

As depicted in FIG. 1A are Web server 101 and Web browser 103. Web browser 103 can send requests (e.g., including Uniform Resource Locators ("URLS")) for Web based content to Web server 101. In response to receiving a request, Web server 101 can send requested Web based content back to Web browser 103 (e.g., matching a URL to requested content or to an application that can provide the content). In some embodiments, Web server 101 and Web browser 103 reside at different computer systems and communicate over a network (e.g., the Internet). In other embodiments, such as, for example, a development environment, Web server 101 and Web browser 103 are on the same computer system or are on different computer systems that are in relative close physical proximity to one another. Accordingly, a developer can use Web browser 103 to test and debug page 111D within the development environment. Page 111D can be viewed as a "design time" document.

To test and/or debug page 111D, a developer can copy page 111D to a virtual directory of storage 141 that is configured to store Web based content. Web browser 103 can submit request 123 (e.g., an HTTP request including a URL) corresponding to the virtual directory to Web server 101. In response to receiving the URL, Web server 101 can access page 111D.

Web server 101 can examine page 111D to determine how to process page 111D. Server side scripts can be extracted and submitted to script engine 102. For example, Web server 101 can extract and submit server scripts 112 to script engine 102. Script engine 102 can process scripts 112 to retrieve content from resources 106 (e.g., databases, Web services, etc.). Script engine 102 can return any retrieved content to Web server 101. For example, in response to receiving and processing server scripts 112, script engine 102 can return server content 116 to Web server 101.

Web server 101 can replace server scripts 112 with server content 116 within page 111D. Insertion of server content 116 can cause the relative locations (e.g., line numbers) of client scripts 113D to change within page 111D. Web server 101 can return a page with changed relative locations (e.g., via HTTP) to Web browser 103. For example, page 111R includes server content 116 (e.g., other HTML instructions resulting from execution of the server side scripts), client scripts 113R, and static HTML 114. Page 111R can be viewed as a run-time document.

Client scripts 113D and client scripts 113R can have identical functionality but be located in a different locations (e.g., at different line numbers) within page 111D and 111R respectively. This can result at least in part due to the replacement of server scripts 112 with server content 116.

Web browser 103 receives and processes page 111R. Web browser 103 can examine page 111R to determine how to process page 111R. Client side scripts can be extracted and submitted to script engine 104. For example, Web browser 101 can extract and submit client scripts 113R to script engine 104. Script engine 104 can process scripts 113R to retrieve content from local resources (e.g., a system clock, local system settings, etc.). Script engine 104 can return any retrieved local content to Web browser 103. For example, in response to receiving and processing client scripts 113R, script engine 104 can return client content 117 to Web browser 103.

Web browser 103 can replace client scripts 113R with client content 117 within page 111R. Web browser 103 can then render the page to a display device and/or other output devices. For example, page 111 Out includes server content 116, client contents (e.g., further HTML instructions resulting from execution of the client side scripts), and static HTML 114. Web browser 103 can render page 111 Out at display device 105.

Within computer architecture 100, breakpoints can be inserted into server side scripts and/or client side scripts to debug Web pages. Each of page designer 118 and script explorer 119 can include a user-interface allowing a developer to insert breakpoints into scripts included in a Web page. Page designer 118 can be configured to allow insertion of breakpoints into client side scripts and server side scripts. Script explorer 119 can be configured to allow insertion of breakpoints into client side scripts. Accordingly, through the appropriate user-interfaces a developer can insert breakpoints into server side scripts and client side scripts as desired.

When a breakpoint is inserted into client side script code at one of page designer 118 and script explorer 119, computer architecture 100 can significantly increase the likelihood of the breakpoint being appropriately mapped between corresponding design time and run-time documents. For example, if page designer 118 inserts a break point into client scripts 113D computer architecture 100 can significantly increase the likelihood of the inserted breakpoint being appropriately mapped into client scripts 113R. Likewise, if script explorer 119 inserts a break point into client scripts 113R computer architecture 100 can significantly increase the likelihood of the inserted breakpoint being appropriately mapped into client scripts 113D.

As depicted in FIG. 1B, page designer 118 can set breakpoint 181 in client scripts 113D. Upon detecting page 111R being subsequently loaded at Web browser 103, page designer 118 can send breakpoint request 131 to script explorer 119. Breakpoint request 131 indicates to script explorer 119 that page designer 118 has set a breakpoint in a mapped location (i.e., in client side script) and that the set breakpoint is to be mapped to the corresponding run-time document, page 111R. In response to breakpoint request 131, script explorer 119 makes page 111R available for parsing.

Likewise as depicted in FIG. 1B, script explorer 119 can set breakpoint 182 in client scripts 113R. Subsequent to setting a breakpoint in a mapped location (i.e., in client side script), script explorer 119 searches for loaded projects of page designer 118. For example, script explorer 119 can send search request 132 to page designer 118 requesting a design-time document corresponding to page 111R. Upon identifying page 111D as the corresponding design-time document, page 111D is made available for parsing.

Generally, as depicted in FIG. 1C, page 111D and page 111R are submitted to a parser, such as, for example, parser 191. Parser 191 is configured to divide received pages into smaller components that can be further analyzed. In some embodiments, parser 191 performs a lexical analysis of pages to divide strings within the pages into components for inclusion in a parse tree. When appropriate parser 191 can subsequently perform a semantic analysis of components to determine the meaning of components.

For example, parser 191 can parse page 111D to generate parse tree 183 of smaller individually accessible components from page 111D. Similarly, parser 191 can parse page 111R to generate parse tree 184 of smaller individually accessible components from page 111R. Accordingly, client script blocks can be divided out of pages 111D and 111R thus disassociating the client scripts with their relative locations within pages 111D and 111R. For example, client scripts 113D can be divided out of page 111D disassociating client scripts 113D with their relative locations in page 111D. Similarly, client scripts 113R can be divided out of page 111R disassociating client scripts 113R with their relative locations in page 111R.

Extractor 192 is configured to walk parse trees and extract client script blocks from within the parse trees. For example, extractor 192 can walk parse tree 183 and extract client script 113D, including breakpoint 181, from parse tree 183. Similarly, extractor 192 can walk parse tree 184 and extract client scripts 113R, including breakpoint 182, from parse tree 184.

In some embodiments, different parsers are used to perform parsing functionality. The different parsers can include One parser can be used to extract client script blocks from page 111D and another different parser can be used to extract client script blocks from page 111R. For example, page designer 118 can include a built in parser that is used to parse page 111D. Likewise, Web browser 103 can include parser that is used to parse page 111R. The different parsers can interoperate as appropriate to perform the general functions of parser 191 and extractor 192 and transfer parsed script blocks to differ 194.

Differ 194 is configured to examine script blocks from different pages (e.g., a design-time page and corresponding run-time page) and identify corresponding positions within the script blocks. In some embodiments, differ 194 tokenizes on line breaks, hashes the lines, and adds the hashes to a hash table. A mapping is then built using a Heckel diff algorithm to identify corresponding locations between a design-time page and corresponding run-time page. However, the functionality of differ 194 can vary.

When mapping a breakpoint from a design-time page to a run-time page, differ 194 can return a mapping position within the run-time page where the break point is to be mapped. For example, when mapping breakpoint 181 from page 111D to page 111R, differ 194 can return position 161 indicative of position within client scripts 113R where breakpoint 181 is to be mapped. On the other hand, when mapping a breakpoint from a run-time page to a design-time page, differ 194 can return a mapping position within the design-time page where the breakpoint is to be mapped. For example, when mapping breakpoint 182 from page 111R to page 111D, differ 194 can return position 162 indicative of position within client scripts 113D where breakpoint 182 is to be mapped Identifying a mapping position can vary based on the heuristics included in differ 194. In some embodiments, a mapping position is identified when an exact match between a unique line in a design-time page (e.g., line 18 in design-time document 201) and a unique line in a run-time page (e.g., line 14 in run-time document 202) is found. In these embodiments, a breakpoint immediately succeeding line 18 in design-time document 201 can be mapped to location immediately succeeding line 14 in run-time document 202 (or vice versa).

In other embodiments, for example, when a line is not unique (e.g., is found at more than one location in a document), lines surrounding (e.g., before and after) a set breakpoint can be scanned to identify a unique location where the breakpoint is to be mapped. For example, if the line "var A=5" is included in multiple locations in both a design-time and run-time document, instructions surrounding each instance of the line can be scanned to identify a unique mapping location.

Breakpoints can be mapped through reference to corresponding parse trees for design-time documents and run-time documents. For example, referring to FIG. 2, it may be that the breakpoint at line 18 of design-time document 201 is to be mapped to run-time document 202. Through reference to components from appropriate parse trees, differ 194 can determine that the highlighted breakpoint in design-time document 201 (at line 18) is to be mapped to a location after the text "alert("Both Server and Client Buttons have" (line 13 of design-time document 201) and before the text ")" (line 15 in design-time document 201).

A diff algorithm (e.g., a Heckel diff algorithm) can be used to identify a unique match as well as scan surrounding instructions when a line is not unique. Thus, a diff algorithm can be used to determine that line 18 in design-time document 201 corresponds to (e.g., is identical to) line 14 in run-time document 202. Similarly, the diff algorithm can scan surrounding instructions for non unique lines in other design-time documents and corresponding run-time documents. In some embodiments, a differ algorithm first checks for unique lines and, if none or found, falls back to scanning surround instructions for non-unique lines.

Referring back to FIG. 1C, mapper 193 is configured to access a breakpoint from a first client script block, access a second client side script block where the breakpoint is to be mapped, and access a position within the second client side script block. Based on the accessed information, mapper 193 is configured to map the breakpoint into the second client side script block. For example, mapper 193 can access breakpoint 181, client scripts 113R, and position 161. Based on this information, mapper 193 can map break point 181 into client scripts 113R as indicated by mapping 171. Similarly, mapper 193 can access breakpoint 182, client scripts 113D, and position 162. Based on this information, mapper 193 can map break point 182 into client scripts 113D as indicated by mapping 172.

Mapping a breakpoint can include replicating the text of a breakpoint (taken from a source page) at the determined location within a target page. After a breakpoint is mapped, the breakpoint mapping (i.e., the text representing the breakpoint instruction) can be propagated back to the original pages. For example, breakpoint 181 can be propagated to page 111R. Similarly, breakpoint 182 can be propagated to page 111D.

Alternately, the line number of a breakpoint can be stored in memory (e.g., in an array) accessible to a script engine. For example a breakpoint can be stored in a breakpoint array accessible to script explorer 119. During execution of script within a Web based document, the script engine can remain aware of the current line number. For example, when during execution of client scripts 113R, script engine 1119 can remain aware of the current line number in client scripts 113R. As each successive line number is executed, the script engine can refer to the array to determine if a breakpoint has been set for the line number. For example as each line of scripts 113R is executed, script explorer 119 can refer to the breakpoint array to determine if a breakpoint has been set for the line. When the array indicates a breakpoint (mapped or otherwise) for a line number, the script engine stops execution of the Web based document at the line number. For example, when the breakpoint array indicates a breakpoint at a line within client scripts 113R, script explorer 119 can stop executed of client scripts 113R at the line with client scripts 113R.

Thus, embodiments of the invention facilitate extracting corresponding client script blocks from different Web based documents to disassociate the client script blocks with there relative locations within the Web based documents. From the extracted client side script blocks, a position for mapping a breakpoint from one client side script block another client side script block can be determined. The breakpoint is then copied from the one client script block and inserted into the determined position in the other client script block. The client script blocks can then be re-associated with their relative locations in the Web based documents from which they were extracted.

Accordingly, referring briefly back to FIG. 2 again, mapping 271 indicates where the highlighted breakpoint in design-time document 201 can be copied to run-time document 202. Likewise, mapping 272 indicates where the highlighted breakpoint in design-time document 202 can be copied to run-time document 201.

Figure 3:
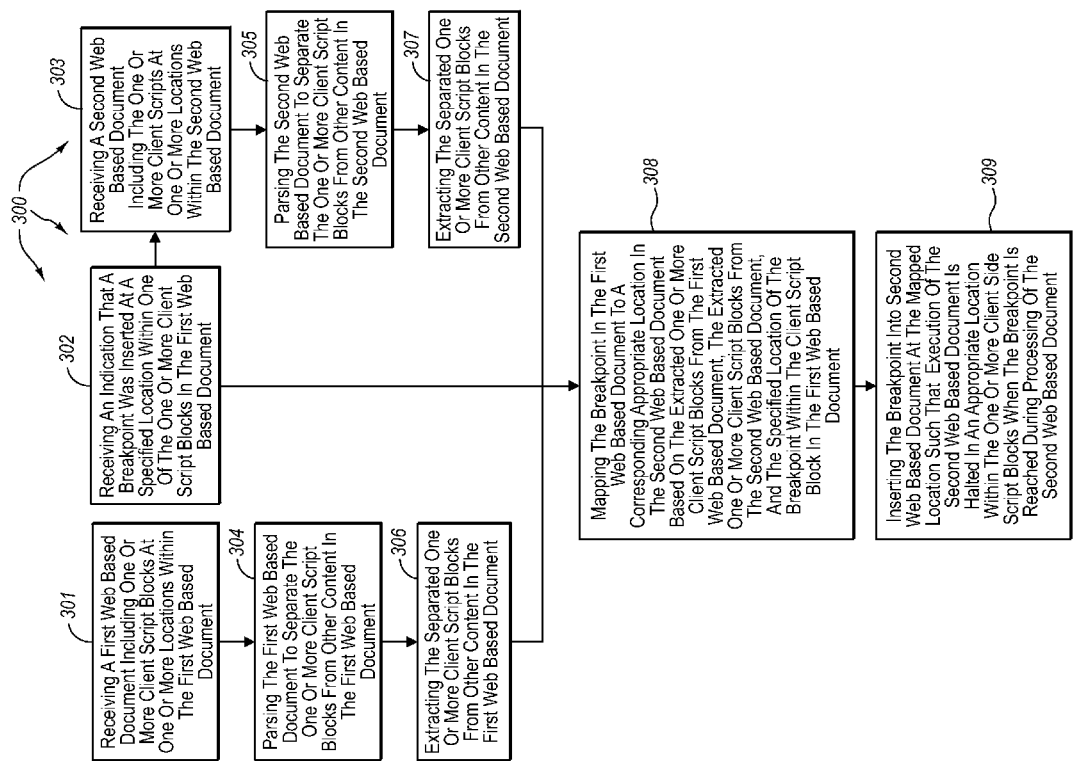
FIG. 3 illustrates a flow chart of an example method for mapping a breakpoint in one Web based document to another Web based document.

FIG. 3 illustrates a flow chart of an example method 300 for mapping a breakpoint in one Web based document to another Web based document. Method 300 will be described with respect to the data and components of computer architecture 100.

Method 300 includes an act of receiving a first Web based document including one or more client script blocks at one or more locations within the first Web based document (act 301). In FIG. 1C, for example, parser 191 can receive page 111D from page designer 118. Client scripts 113D can represent script blocks at one or more locations within page 111D.

Method 300 includes an act of receiving an indication that a breakpoint was inserted at a specified location within one of the one or more client script blocks in the first Web based document (act 302). For example, page designer 118 can detect that a developer has added a breakpoint to a specified location page 111D.

Parser 191 can examine client scripts 113D to detect that text representing breakpoint 181 is included at a specified location within client scripts 131D (e.g., at a specified line number within page 111D). Detecting text representing breakpoint 181 indicates that breakpoint 181 was inserted into page 111D, for example, by a developer of page 111D, to pause execution of a client side script at the specified location with page 111D.

Method 300 includes an act of receiving a second Web based document including the one or more client scripts at one or more locations within the second Web based document (act 303). For example, parser 191 can receive page 111R from script explorer 119. Client scripts 113R can represent script blocks at one or more locations within page 111R. The locations of client scripts 113R relative to other instructions in page 111R and the locations of client scripts 113D relative to other instructions in page 111D can differ due at least to the substitution of server content 116 for server scripts 112.

Method 300 includes an act of parsing the first Web based document to separate the one or more client script blocks from other content in the first Web based document (act 304). For example, parser 191 can parse page 111D to generate parse tree 183. Within parse tree 183, client scripts 113D can be separated from other content of page 111D.

Method 300 includes an act of parsing the second Web based document to separate the one or more client script blocks from other content in the second Web based document (act 305). For example, parser 191 can parse page 111R to generate parse tree 184. Within parse tree 184, client scripts 113R can be separated from other content of page 111R.

Method 300 includes an act of extracting the separated one or more client script blocks from other content in the first Web based document (act 306). For example, extractor 192 can extract client scripts 113D from parse tree 183. Method 300 includes an act extracting the separated one or more client script blocks from other content in the second Web based document (act 307). For example, extractor 192 can extract client scripts 113R from parse tree 184.

Method 300 includes an act of mapping the breakpoint in the first Web based document to a corresponding appropriate location in the second Web based document based on the extracted one or more client script blocks from the first Web based documents the extracted one or more client script blocks from the second Web based document, and the specified location of the breakpoint within the client script block in the first Web based document (act 308). For example, differ 194 and mapper 193 can interoperate to map breakpoint 181 to an appropriate location within scripts 113R (i.e., mapping 171) based on client scripts 113D, client scripts 113R, and position 161.

Method 300 includes an act of inserting the breakpoint into second Web based document at the mapped location such that execution of the second Web based document is halted in an appropriate location within the one or more client side script blocks when the breakpoint is reached during processing of the second Web based document (act 309). For example, extractor 192 can insert text for breakpoint 181 into a node of parse tree 184, wherein the node corresponds to the appropriate portion of client scripts 113R. Parser 191 can then propagate the text for breakpoint 181 to the appropriate location in page 111R.

Method 300 can be similarly applied to map breakpoint 182 to page 111D.

Either of page designer 118 or script explorer 119 can initiate the mapping of a breakpoint between client side scripts in different Web based documents. Alternatively, some other module of computer architecture in communication with script explorer 119 and page designer 118 can initiate mapping of a breakpoint between client side scripts in different Web based documents. Thus, any of page designer 118, script explorer 119, or some other communicatively coupled module can instantiate parser 191, extractor 192, mapper 193, and differ 194 to facilitate and manage breakpoint mapping.

Figure 4:
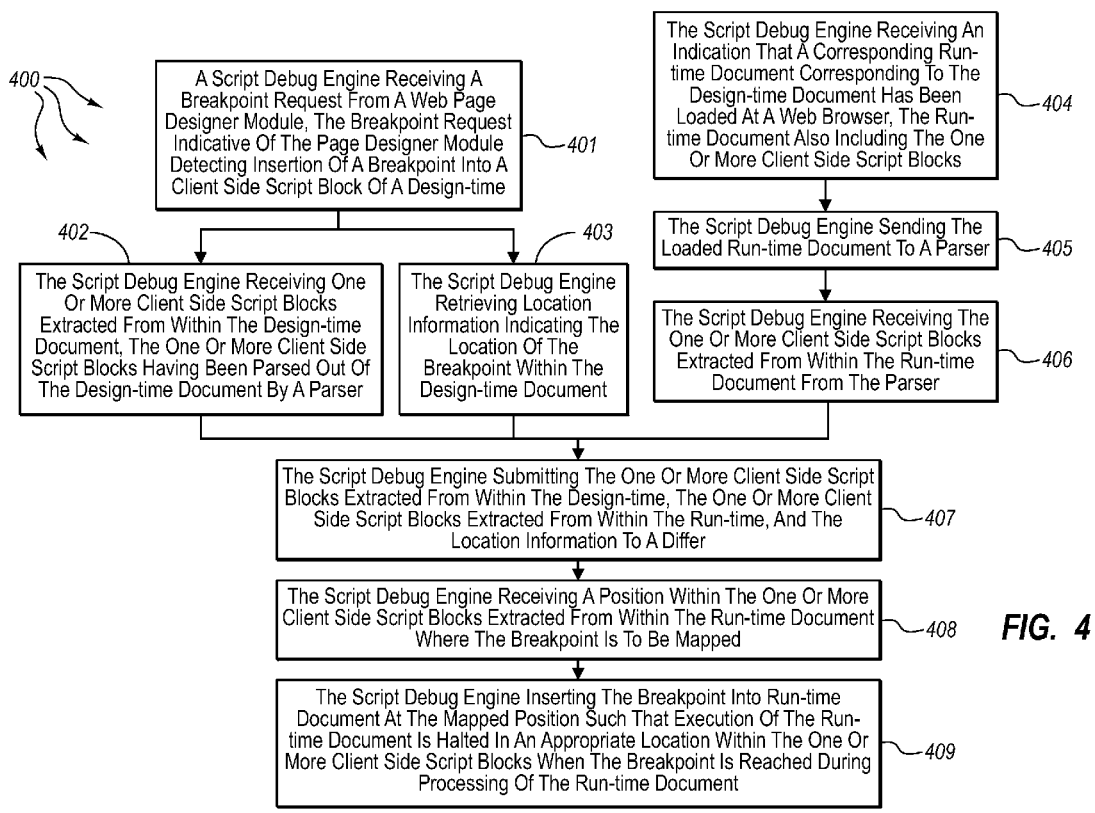
FIG. 4 illustrates a flow chart of an example method for mapping a breakpoint in a client side script block of a design-time document to the appropriate location in a client side script block of the corresponding run-time document.

FIG. 4 illustrates a flow chart of an example method 400 for mapping a breakpoint in a client side script block of a design-time document to the appropriate location in a client side script block of the corresponding run-time document. Method 400 can facilitate the mapping of a breakpoint when a developer sets a breakpoint in a design-time (e.g., server side) document.

Referring to FIG. 1B, in response to detecting insertion of breakpoint 181, page designer 118 can determine that breakpoint 181 has been inserted into client scripts 113D. Subsequently, page designer 118 sends breakpoint request 131 to script explorer 119 to indicate that breakpoint 181 was inserted into client scripts 113D.

Method 400 includes an act of the script debug engine receiving a breakpoint request from a Web page designer module, the breakpoint request indicative of the page designer module detecting insertion of a breakpoint into a client side script block of a design-time document (act 401). For example, script explorer 119 can receive breakpoint request 131 from page designer 118. Breakpoint request 131 indicates to script explorer 119 that breakpoint 181 was inserted into client scripts 113D.

In combination with notifying script explorer 119 of breakpoint 181, page designer 118 can submit page 111D to parser 191. As previously described and depicted in FIG. 1C, parser 191 can generate parse tree 183 from page 111D. Extractor 192 can then extract client scripts 113D, including breakpoint 181, from parse tree 183. Scripts 113D are then available to script explorer 119 for further processing.

Method 400 includes an act of the script debug engine receiving one or more client side script blocks extracted from within the design-time document, the one or more client side script blocks having been parsed out of the design-time document by a parser (act 402). For example, script explorer 119 can access client scripts 113D as output from extractor 192.

Method 400 includes an act of the script debug engine retrieving location information indicating the location of the breakpoint within the design-time document (act 403). For example, script explorer 119 can examine client scripts 113D and retrieve the location of breakpoint 181.

Method 400 includes an act of the script debug engine receiving an indication that a corresponding run-time document corresponding to the design-time document has been loaded at a Web browser, the run-time document also including the one or more client side script blocks (act 404). For example, referring briefly back to FIG. 1A, script explorer 119 can receive an indication from Web browser 103 that page 111R has been loaded at Web browser 103. Page 111R can be loaded at Web browser 103 in response to developer commands or a prior request for page Method 400 includes an act of the script debug engine sending the loaded run-time document to a parser (act 405). For example, script explorer 119 can send page 111R to parser 191. Method 400 includes an act of the script debug engine receiving the one or more client side script blocks extracted from within the run-time document from the parser (act 406). For example, referring again to FIG. 1C, script explorer 119 can receive client scripts 113R output from extractor 192.

Method 400 includes an act of the script debug engine submitting the one or more client side script blocks extracted from within the design-time, the one or more client side script blocks extracted from within the run-time, and the location information to a differ (act 407). For example, script debugger 119 can submit client scripts 113D, client scripts 113R, and the location information retrieved in act 403, to differ 194.

Method 400 includes an act of the script debug engine receiving a position within the one or more client side script blocks extracted from within the run-time document where the breakpoint is to be mapped (act 408). For example, script explorer 119 can receive position 161 from differ 194. Position 161 indicates a location within client scripts 113R where breakpoint 181 is to be mapped.

Method 400 includes an act of the script debug engine inserting the breakpoint into run-time document at the mapped position such that execution of the run-time document is halted in an appropriate location within the one or more client side script blocks when the breakpoint is reached during processing of the run-time document (act 409). For example, script explorer 119 can insert breakpoint 181 into client scripts 113R at position 161.

Figure 5:
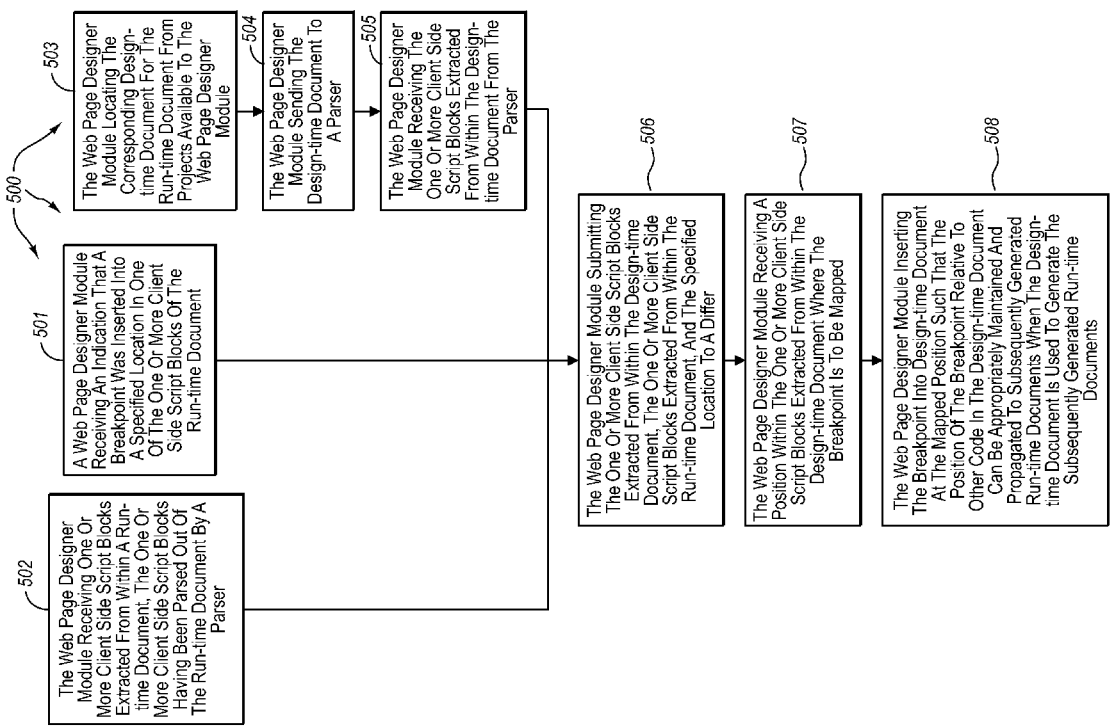
FIG. 5 illustrates a flow chart of an example method for mapping a breakpoint in a client side script block of a run-time document to the appropriate location in a client side script block of the corresponding design-time document.

FIG. 5 illustrates a flow chart of an example method 500 for mapping a breakpoint in a client side script block of a run-time document to the appropriate location in a client side script block of the corresponding design-time document. Method 500 will be described with respect to the components of computer architecture 100. Method 500 can facilitate the mapping of a breakpoint when a developer sets a breakpoint in a run-time (e.g., client side) document.

Referring again to FIG. 1B, in response to detecting insertion of breakpoint 182, script explorer 119 can determine that breakpoint 182 has been inserted into client scripts 113R. Subsequently, script explorer 119 sends search request 132 to page designer 118 to indicate that breakpoint 182 was inserted into client scripts 113R. Search request 132 can include information for identifying a loaded project at page designer 118 that corresponds to page 111R.

Method 500 includes an act of a Web page designer module receiving an indication that a breakpoint was inserted into a specified location in one of the one or more client side script blocks of the run-time document (act 501). For example, page designer 118 can receive search request 132 indicating that breakpoint 182 was inserted into a specified location of page 111R.

In combination with sending search request 132, script explorer 119 can submit page 111R to parser 191. As previously described and depicted in FIG. 1C, parser 191 can generate parse tree 184 from page 111R. Extractor 192 can then extract client scripts 113R, including breakpoint 182, from parse tree 184. Scripts 113R are then available to page designer 118 for further processing.

Method 500 includes an act of a Web page designer module receiving one or more client side script blocks extracted from within a run-time document, the one or more client side script blocks having been parsed out of the run-time document by a parser (act 502). For example, page designer 118 can access client scripts 113R as output from extractor 192.

Method 500 includes an act of the Web page designer module locating the corresponding design-time document for the run-time document from projects available to the Web page designer module (act 503). For example, page designer 111D can scan any currently loaded projects to locate page 113D.

Method 500 includes an act of the Web page designer module sending the design-time document to a parser (act 504). For example, page designer 118 can send page 111D to parser 191. Method 500 includes an act of the Web page designer module receiving the one or more client side script blocks extracted from within the design-time document from the parser (act 505). For example, referring again to FIG. 1C, page designer 111D can receive client scripts 113D output from extractor 192.

Method 500 includes an act of the Web page designer module submitting the one or more client side script blocks extracted from within the design-time document, the one or more client side script blocks extracted from within the run-time document, and the specified location to a differ (act 506). For example, page designer 118 can submit client scripts 113R, client scripts 113D, and the location information of breakpoint 182 (within page 111R) to differ 194.

Method 500 includes an act of the Web page designer module receiving a position within the one or more client side script blocks extracted from within the design-time document where the breakpoint is to be mapped (act 507). For example, page designer 118 can receive position 162 from differ 194. Position 162 indicates a location within client scripts 113D where breakpoint 182 is to be mapped.

Method 500 includes an act of the Web page designer module inserting the breakpoint into design-time document at the mapped position such that the position of the breakpoint relative to other code in the design-time document can be appropriately maintained and propagated to subsequently generated run-time documents when the design-time document is used to generate the subsequently generated run-time documents (act 508). For example, page designer 118 can insert breakpoint 182 into client scripts 113 D at position 162. Breakpoint 182 is then available for use in subsequent debug sessions.

Thus, embodiments of the present invention can be used to map breakpoints between appropriate locations in Web based documents. Corresponding client script blocks can be extracted from different Web based documents to disassociate the client script blocks with their relative locations within the Web based documents. From the extracted client side script blocks, a position for mapping a breakpoint from one client side script block another client side script block can be determined. The breakpoint is then copied from the one client script block and inserted into the determined position in the other client script block. The client script blocks can then be re-associated with their relative locations in the Web based documents from which they were extracted.

Accordingly, a developer can use a page designer to set a breakpoint directly in an Active Server Pages ("ASP") document and have the breakpoint automatically transferred to the appropriate location within a corresponding run-time document. Similarly, a user or developer can set a breakpoint in a run-time document and have the breakpoint automatically transferred to the appropriate location in the corresponding original ASP document (so that the breakpoint is saved for subsequent debugging sessions).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for mapping a breakpoint in one Web based document to another Web based document, the method comprising:

an act of receiving a first Web based document including one or more client script blocks at one or more locations within the first Web based document;

an act of receiving an indication that a breakpoint was inserted at a specified location within one of the one or more client script blocks in the first Web based document;

an act of receiving a second Web based document including the one or more client scripts at one or more locations within the second Web based document;

an act of parsing the first Web based document to separate the one or more client script blocks from other content in the first Web based document;

an act of parsing the second Web based document to separate the one or more client script blocks from other content in the second Web based document;

an act of extracting the separated one or more client script blocks from other content in the first Web based document;

an act of extracting the separated one or more client script blocks from other content in the second Web based document;

an act of mapping the breakpoint in the first Web based document to a corresponding appropriate location in the second Web based document based on the extracted one or more client script blocks from the first Web based document, the extracted one or more client script blocks from the second Web based document, and the specified location of the breakpoint within the client script block in the first Web based document; and an act of inserting the breakpoint into second Web based document at the mapped location such that execution of the second Web based document is halted in an appropriate location within the one or more client script blocks when the breakpoint is reached during processing of the second Web based document.

2. The method as recited in claim 1, wherein the act of receiving a first Web based document including one or more client script blocks comprises an act of receiving a server side design-time Web page document.

3. The method as recited in claim 2, wherein the act of receiving a second Web based document including the one or more client scripts comprises an act of receiving a client side run-time Web page document.

4. The method as recited in claim 1, wherein the act of receiving an indication that a breakpoint was inserted at a specified location within one of the one or more client script blocks comprises an act of receiving a line number within the first document.

5. The method as recited in claim 1, wherein the act of parsing the first Web based document to separate the one or more client script blocks from other content in the first Web based document comprises an act of generating a parse tree for the first Web based document.

6. The method as recited in claim 5, wherein the act of parsing the second Web based document to separate the one or more client script blocks from other content in the second Web based document comprises an act of generating a parse tree for the second Web based document.

7. The method as recited in claim 1, wherein the act of extracting the separated one or more client script blocks from other content in the first Web based document comprises an act of extracting Java script instructions from a parse tree representing the content of the first Web based document.

8. The method as recited in claim 7, wherein act of extracting the separated one or more client script blocks from other content in the second Web based document comprises an act of extracting Java script instructions from a parse tree representing the content of the second Web based document.

9. The method as recited in claim 1, wherein the act of mapping the breakpoint in the first Web based document to a corresponding appropriate location in the second Web based document comprises an act of using a differ algorithm to identify similar lines of text in the one or more script blocks of the first Web based document and the one or more script blocks of the second Web based document.

10. The method as recited in claim 9, wherein the act using a differ algorithm to identify similar lines of text in the one or more script blocks of the first Web based document and the one or more scripts block of the second Web based document comprises an act of identifying identical lines of text in the one or more script block of the first Web based document and the one or more script block of the first Web based document.

11. The method as recited in claim 10, the act of inserting the breakpoint into second Web based document at the mapped location comprises an act of inserting a breakpoint into the second Web based document that indicates execution of the second Web based document is to be stopped at a corresponding appropriate location in the second Web based document.

12. The method as recited in claim 9, wherein the act using a differ algorithm to identify similar lines of text in the one or more script blocks of the first Web based document and the one or more scripts block of the second Web based document comprises an act of using a Heckel differ algorithm.

13. The method as recited in claim 1, wherein the breakpoint is inserted into the first Web based document by a Web page designer.

14. The method as recited in claim 1, wherein the breakpoint is inserted into the first Web based document by a script explorer configured to debug scripts for Web pages loaded in Web browser.

15. At a computer system including a Web page designer module for developing design-time Web documents and a script debug engine for debugging run-time Web documents, a method for mapping a breakpoint in a client side script block of a design-time document to an appropriate location in a client side script block of a corresponding run-time document for the design-time document, the method comprising:

an act of the script debug engine receiving a breakpoint request from the Web page designer module, the breakpoint request indicative of the Web page designer module detecting an insertion of a breakpoint into the client side script block of the design-time document;

an act of the script debug engine receiving one or more client side script blocks extracted from within the design-time document, the one or more client side script blocks having been parsed out of the design-time document by a parser;

an act of the script debug engine retrieving location information indicating a location of the breakpoint within the design-time document;

an act of the script debug engine receiving an indication that the corresponding run-time document for the design-time document has been loaded at a Web browser, the run-time document also including the one or more client side script blocks;

an act of the script debug engine sending the loaded run-time document to a parser;

an act of the script debug engine receiving the one or more client side script blocks extracted from within the run-time document from the parser;

an act of the script debug engine submitting the one or more client side script blocks extracted from within the design-time document, the one or more client side script blocks extracted from within the run-time document, and the location information of the breakpoint to a differ, wherein the differ is configured to identify a corresponding appropriate location within the one or more client script blocks in the run-time document that corresponding the specified location of the breakpoint in the client script block within the design-time document;

an act of the script debug engine receiving a mapped position within the one or more client side script blocks extracted from within the run-time document where the breakpoint is to be mapped; and an act of the script debug engine inserting the breakpoint into run-time document at the mapped position such that execution of the run-time document is halted in an appropriate location within the one or more client side script blocks when the breakpoint is reached in during processing of the run-time document.

16. The method as recited in claim 15, wherein the one or more client side script blocks in the run-time document are Java script instructions.

17. The method as recited in claim 15, wherein the act of the script debug engine submitting the one or more client side script blocks extracted from within the design-time, the one or more client side script blocks extracted from within the design-time, and the location information to a differ comprises an act of instantiating a Heckel differ algorithm.

18. At a computer system including a Web page designer module for developing design-time Web documents and a script debug engine for debugging run-time Web documents, a method for mapping a breakpoint in a client side script block of a run-time document to an appropriate location in a client side script block of a corresponding design-time document for the run-time document, the method comprising:

an act of the Web page designer module receiving one or more client side script blocks extracted from within the run-time document, the one or more client side script blocks having been parsed out of the run-time document by a parser;

an act of the Web page designer module receiving an indication that a breakpoint was inserted into a specified location in one of the one or more client side script blocks of the run-time document;

an act of the Web page designer module locating the corresponding design-time document for the run-time document from projects available to the Web designer module;

an act of the Web page designer module sending the design-time document to a parser;

an act of the Web page designer module receiving the one or more client side script blocks extracted from within the design-time document from the parser;

an act of the Web page designer module submitting the one or more client side script blocks extracted from within the design-time document, the one or more client side script blocks extracted from within the run-time document, and the specified location of the breakpoint to a differ, wherein the differ is configured to identify a corresponding appropriate location within the one or more client script blocks in the design-time document that corresponding the specified location of the breakpoint in the client script block within the run-time document;

an act of the Web page designer module receiving a mapped position within the one or more client side script blocks extracted from within the design-time document where the breakpoint is to be mapped; and an act of the Web page designer module inserting the breakpoint into design-time document at the mapped position such that the position of the breakpoint relative to other code in the design-time document can be appropriately maintained and propagated to subsequently generated run-time documents when the design-time document is used to generate the subsequently generated run-time documents.

19. The method as recited in claim 18, wherein the one or more client side script blocks in the design-time document are Java script instructions.

20. The method as recited in claim 18, wherein the act of the Web page designer submitting the one or more client side script blocks extracted from within the design-time document, the one or more client side script blocks extracted from within the run-time document, and the location information to a differ comprises an act of instantiating a Heckel differ algorithm.

* * * * *